Nov. 20, 1956 R. W. DANIELS ET AL 2,771,206

MACHINES FOR BUNDLING COMPONENTS

Filed Oct. 18, 1954 8 Sheets-Sheet 1

Inventors
Richard W. Daniels
Hammond P. Diggle
Bruce N. Smith
By their Attorney
W. Bigelow Hall Inventors
Richard W. Daniels
Hammond P. Diggle
Bruce N. Smith
By their Attorney
W. Bigelow Hall Inventors
Richard W. Daniels
Hammond P. Diggle
Bruce N. Smith
By their Attorney
W. Bigelow Hall Inventors
Richard W. Daniels
Hammond P. Diggle
Bruce N. Smith
By their Attorney

MACHINES FOR BUNDLING COMPONENTS

Filed Oct. 18, 1954 8 Sheets-Sheet 5

Inventors
Richard W. Daniels
Hammond P. Diggle
Bruce N. Smith
By their Attorney

Nov. 20, 1956 R. W. DANIELS ET AL 2,771,206

MACHINES FOR BUNDLING COMPONENTS

Filed Oct. 18, 1954 8 Sheets-Sheet 6

Inventors
Richard W. Daniels
Hammond P. Diggle
Bruce N. Smith
By their Attorney

[signature]

MACHINES FOR BUNDLING COMPONENTS

Inventors
Richard W. Daniels
Hammond P. Diggle
Bruce N. Smith
By their Attorney
W. Bigelow Hall

MACHINES FOR BUNDLING COMPONENTS

Filed Oct. 18, 1954 8 Sheets-Sheet 8

Inventors
Richard W. Daniels
Hammond P. Diggle
Bruce N. Smith
By their Attorney
W. Bigelow Hall United States Patent Office 2,771,206

Patented Nov. 20, 1956

2,771,206

MACHINES FOR BUNDLING COMPONENTS

Richard W. Daniels, Wenham, Hammond P. Diggle, Hamilton, and Bruce N. Smith, Essex, Mass., assignors to United Shoe Machinery Corporation, Flemington, N. J., a corporation of New Jersey Application October 18, 1954, Serial No. 463,022

16 Claims. (Cl. 216—9)

This invention relates to a machine for bundling elongated articles, and is more particularly concerned with providing mechanical means for linking a plurality of electronic components in flexible side-by-side relation. Bundling components in this way renders them conveniently available for use, for example, in machines adapted to install them successively. It will be appreciated that although the invention is herein illustrated as employed in a machine for packaging electronic components, it is not thus limited in its application but has utility in belting varous types of articles, especially those having slender extremities.

At present great quantities of lead-bearing components such as resistors, capacitors, etc. are required for installation in electronic assemblies such as radio and television sets. In considerable measure these components have become standardized in shape and operating characteristics, and it is expected that component inserting machines will, therefore, shortly become available commercially to facilitate fastening the leads of such components in various types of circuitry, especially in circuitry on printed wiring boards. Some component manufacturers who formerly merely packed their electrical elements in random fashion now supply their products in boxes in which the leads are somewhat alined, and others have adopted the practice of mounting small numbers of their coaxially-leaded components in spaced, generally parallel relation in rather stiff holders which may, for instance, be of cardboard. It is found essential that some means be provided for protecting the pliant leads and the component bodies against damage and distortion so as to enable them to be compactly stored and later fed in orderly arrangement for convenient, individual application.

The present invention has an object, in the light of the foregoing, the provision of an improved high capacity bundling machine for producing a continuous bundle or package of articles, for example components belted substantially or otherwise connected by flexible linking means.

As illustrated herein, a row of components arranged in side-by-side relation has the end portions of the leads of the components spaced and received transversely within linking means such as lengths of folded tape. Various features of the illustrative machine herein shown may be modified and/or rearranged without departing from the scope of this invention and hence, for instance, the belting mechanism may be altered or shifted so that only a single unfolded tape extends transversely across successive component bodies, or confronting lengths of tape are applied across the leads and spaced from the bodies. While lending themselves to being accurately fed to their respective points of application, the bodies of these taped components and adjoining lead portions are thus accessible for convenience in performing subsequent mechanical operations such as cutting the leads to predetermined lengths, forming the leads, and installing the formed leads. One power operated machine for rapidly and reliably performing these operations in sequence on the leads of successive electronic components, especially if they be belted in parallel formation by the means just indicated, is disclosed in an application filed September 27, 1954, in the names of Leon D. Alderman et al., and bearing Serial No. 458,312.

In accordance with the object above stated, the present invention in one aspect provides a novel machine organization comprising means for moving a row of elongated articles, for example electronic components, in spaced side-by-side arrangement along a path, means arranged on opposite sides of that path for delivering continuous lengths of tape to the adjacent ends of the moving articles successively to bind them while they are thus spaced, and means including a reel adjacent to an end of said path for receiving from said article moving means the bound components.

In view of the tendency of lead wire easily to become bent another feature of the invention resides in the incorporation, in a component bundling machine of the type indicated, of mechanism for straightening the successive pairs of oppositely extending leads commonly projecting coaxially from the respective component bodies. As herein shown, the wire straightening mechanism includes spaced lead supporting tracks adapted to carry between them a row of the bodies in side-by-side relation while suspended therebetween for rotation about their respective axes, said tracks respectively having a portion extending with diminishing concavity in the direction of travel and becoming flat, spaced lead formers respectively cooperative with said track portions and adapted increasingly to confine the leads therebetween during their travel, and means engageable with the suspended component bodies successively to spin them on their axes during their travel whereby their leads are caused by the tracks and formers progressively to assume a coaxial relation. More particularly, and as herein illustrated, the component spinning means preferably takes the form of a rotary wheel having a tread of rubber or other slightly yieldable composition and of sufficient size to assure frictional contact with several bodies simultaneously, the wheel being arranged to apply maximum rotative force on the component body or bodies having leads just entering or within the flat zones defined by the tracks and the guides.

The above and other features of the invention, including various novel details of construction and arrangements of parts, will now be more fully described in connection with an illustrative embodiment and with reference to the accompanying drawings thereof, in which Fig. 1 is a view in side elevation of an exemplary bundling machine in which the invention is embodied, portions of a frame for supporting the same being broken away;

Fig. 1*a* is a vertical section taken on the line I*a*—I*a* of Fig. 1 and looking in the direction there indicated by arrows;

Figure 1:
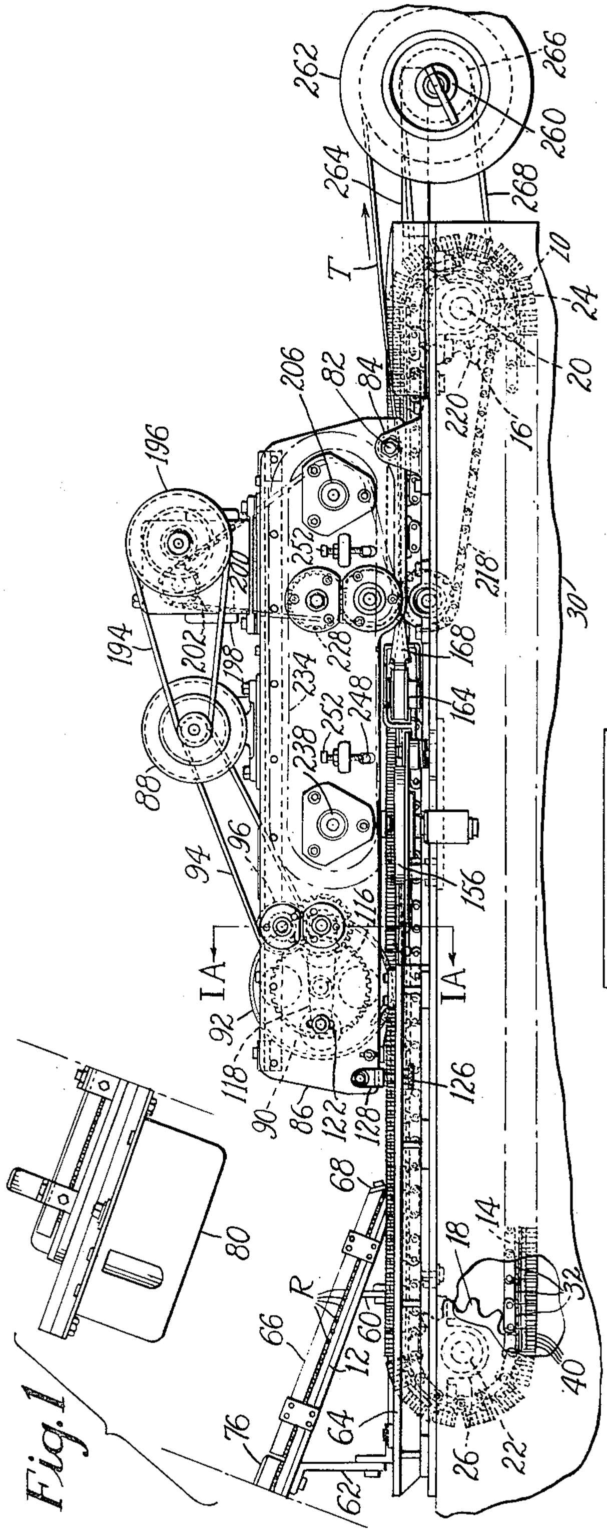
Figure 1A:
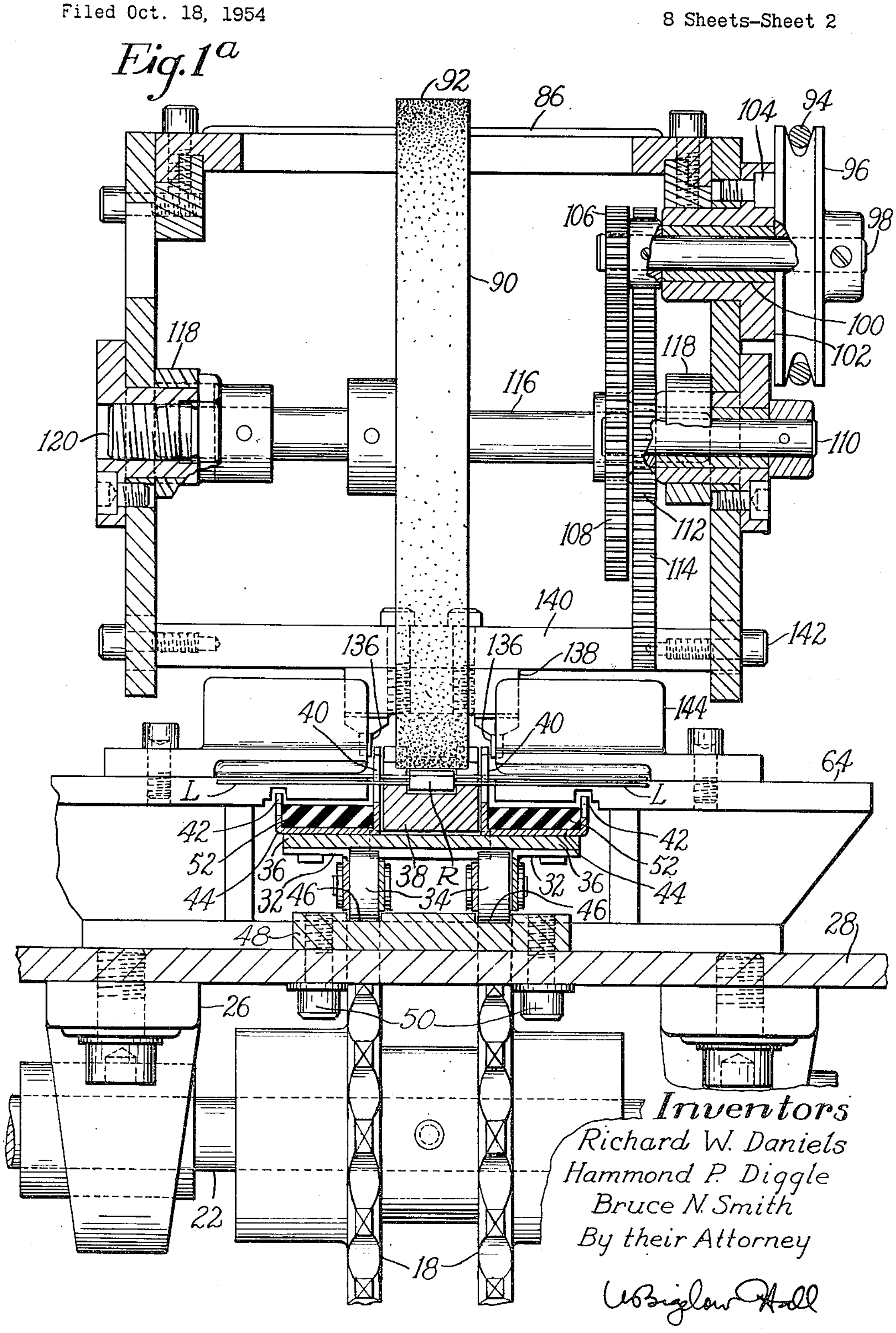
Figure 4:
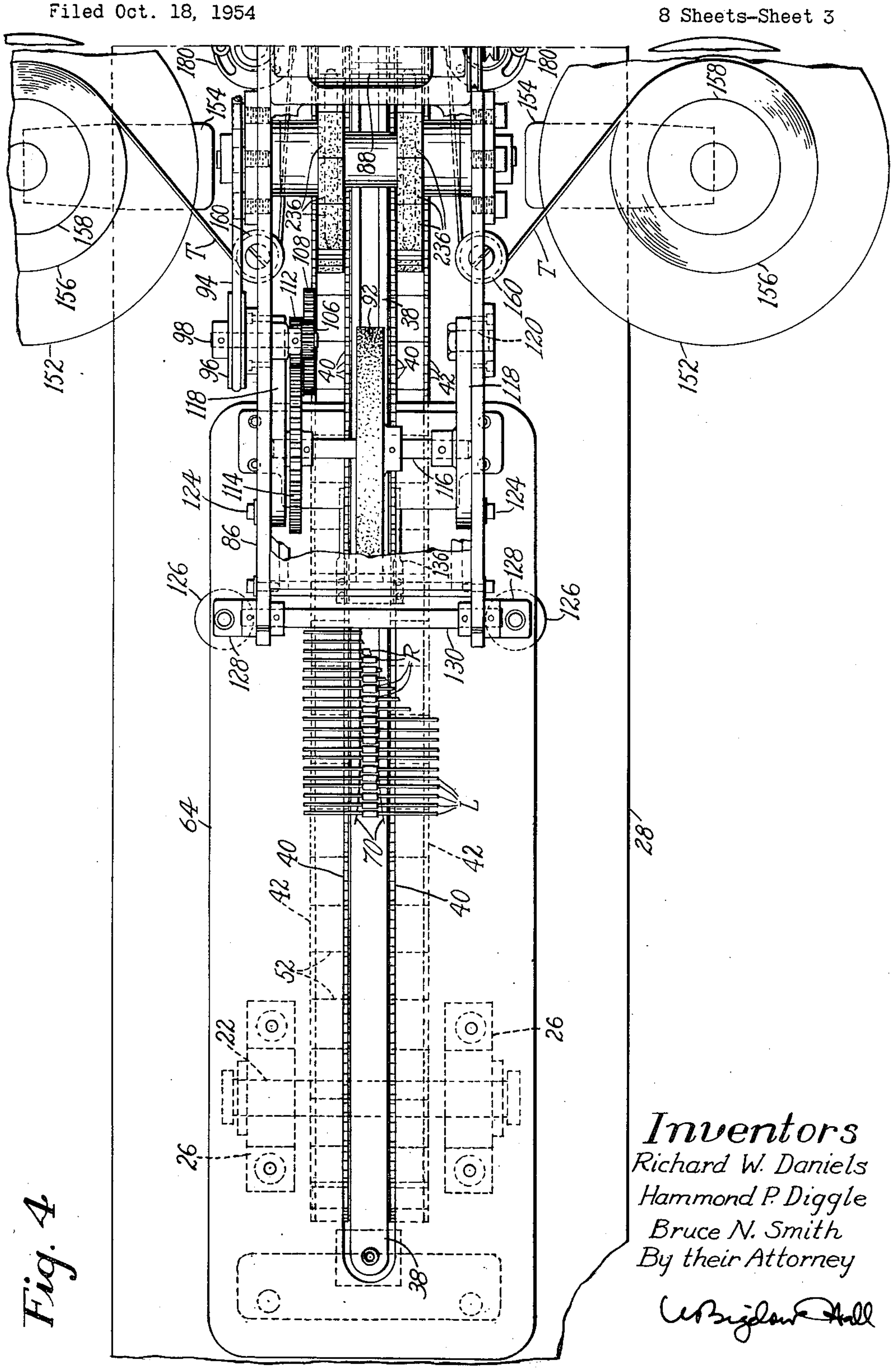
Fig. 4 is a plan view of a left-hand portion of the machine, the raceway and other parts being broken away to show construction.
Figure 4A:
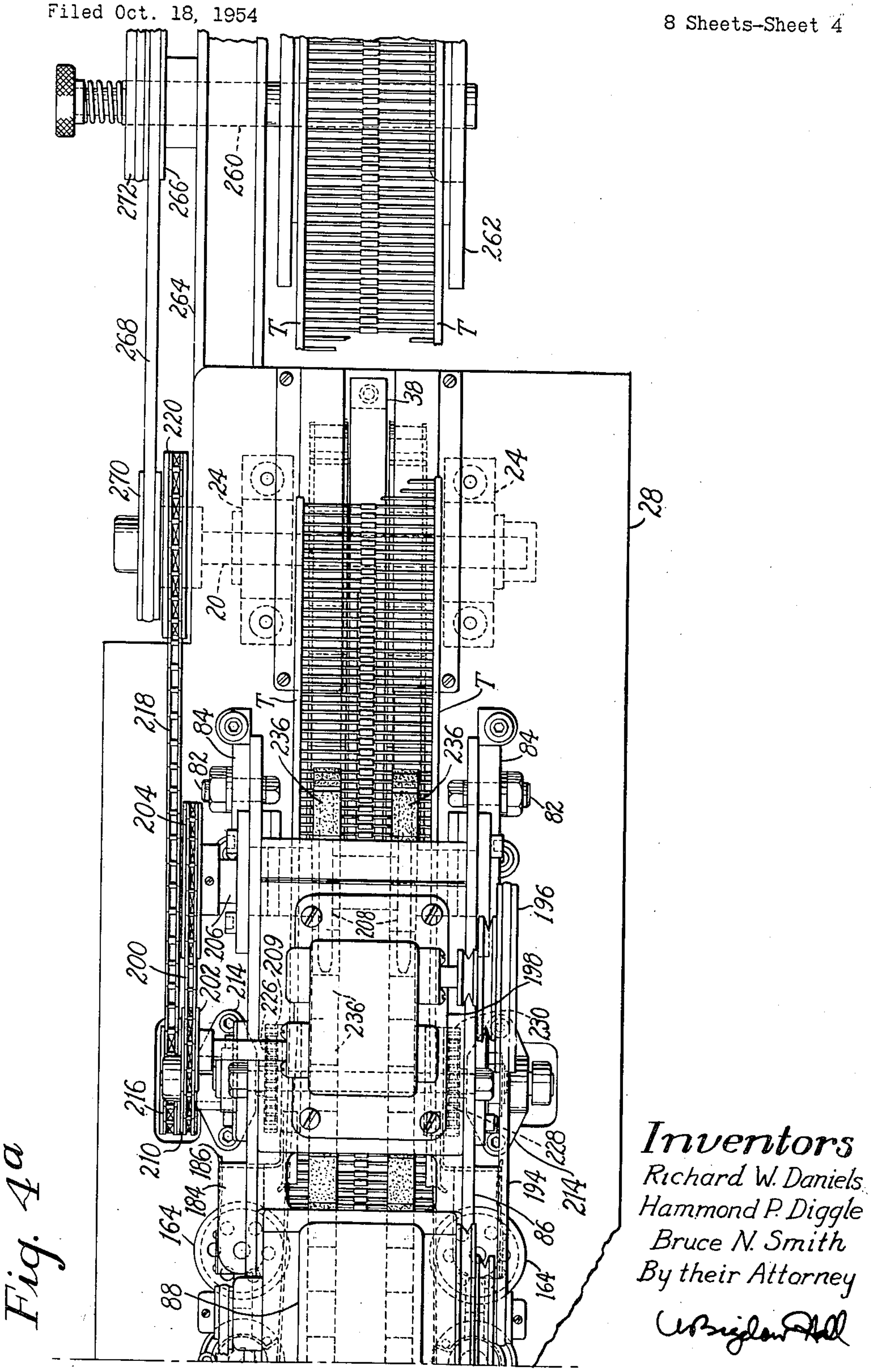
Figure 5:
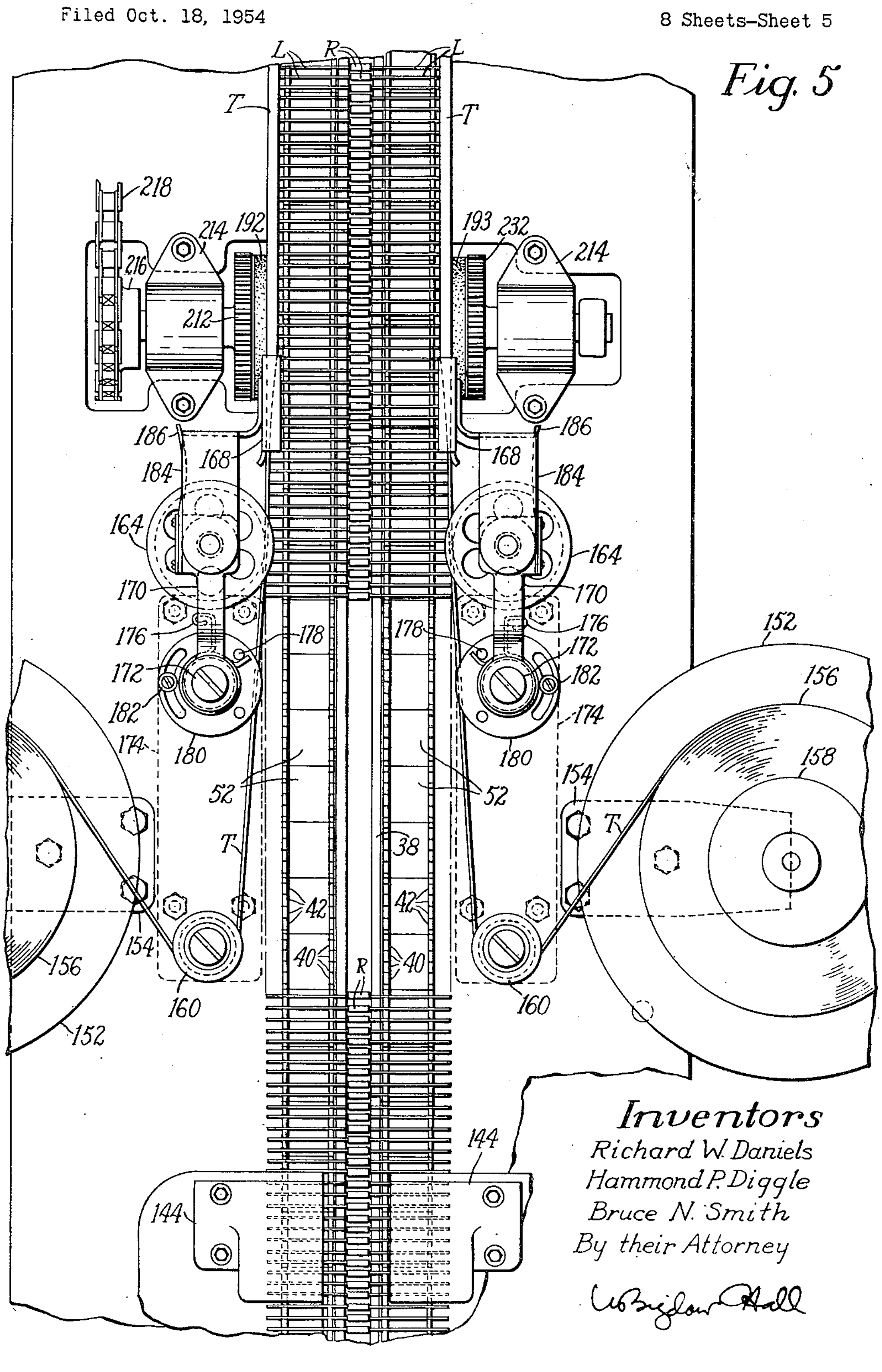
Figure 6:
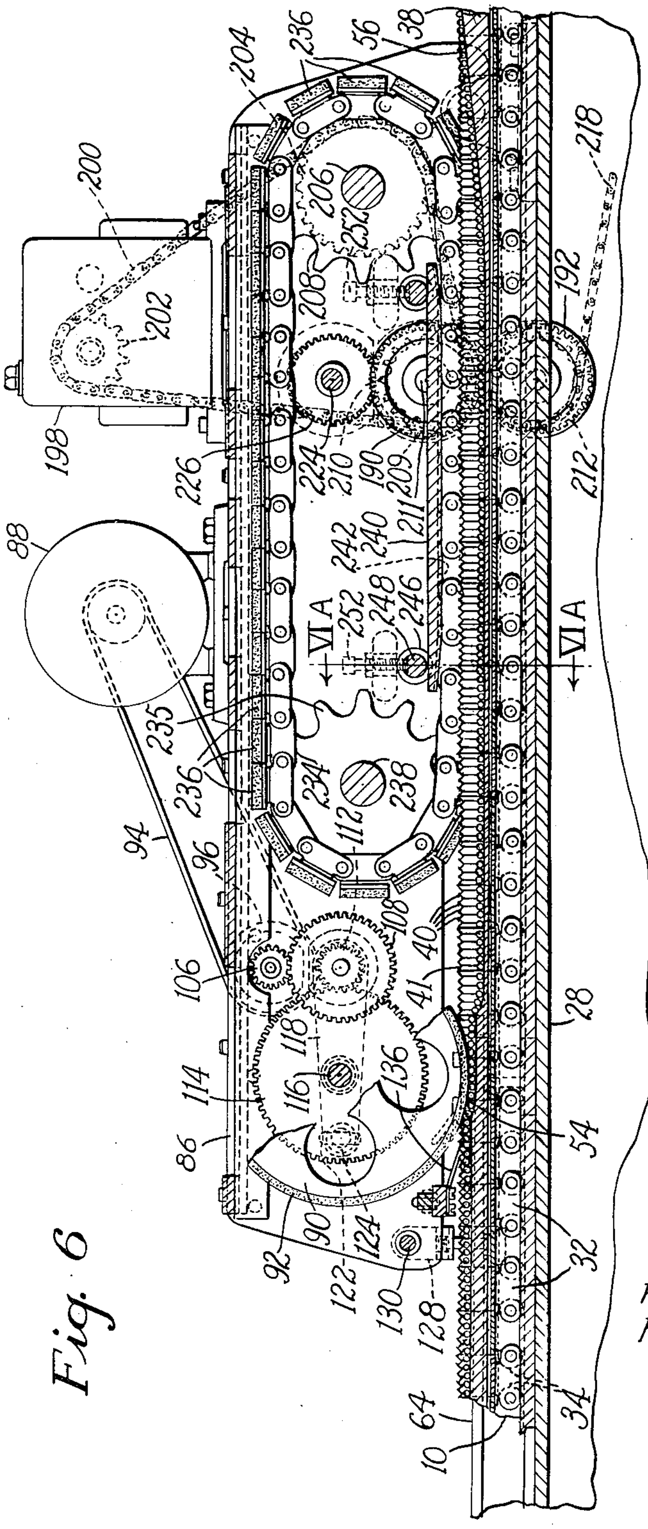
Figure 6A:
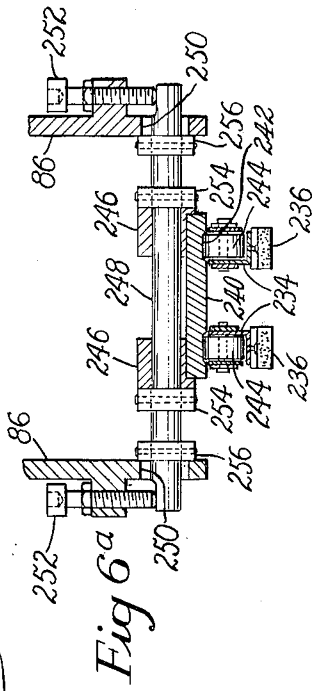
Figure 7:
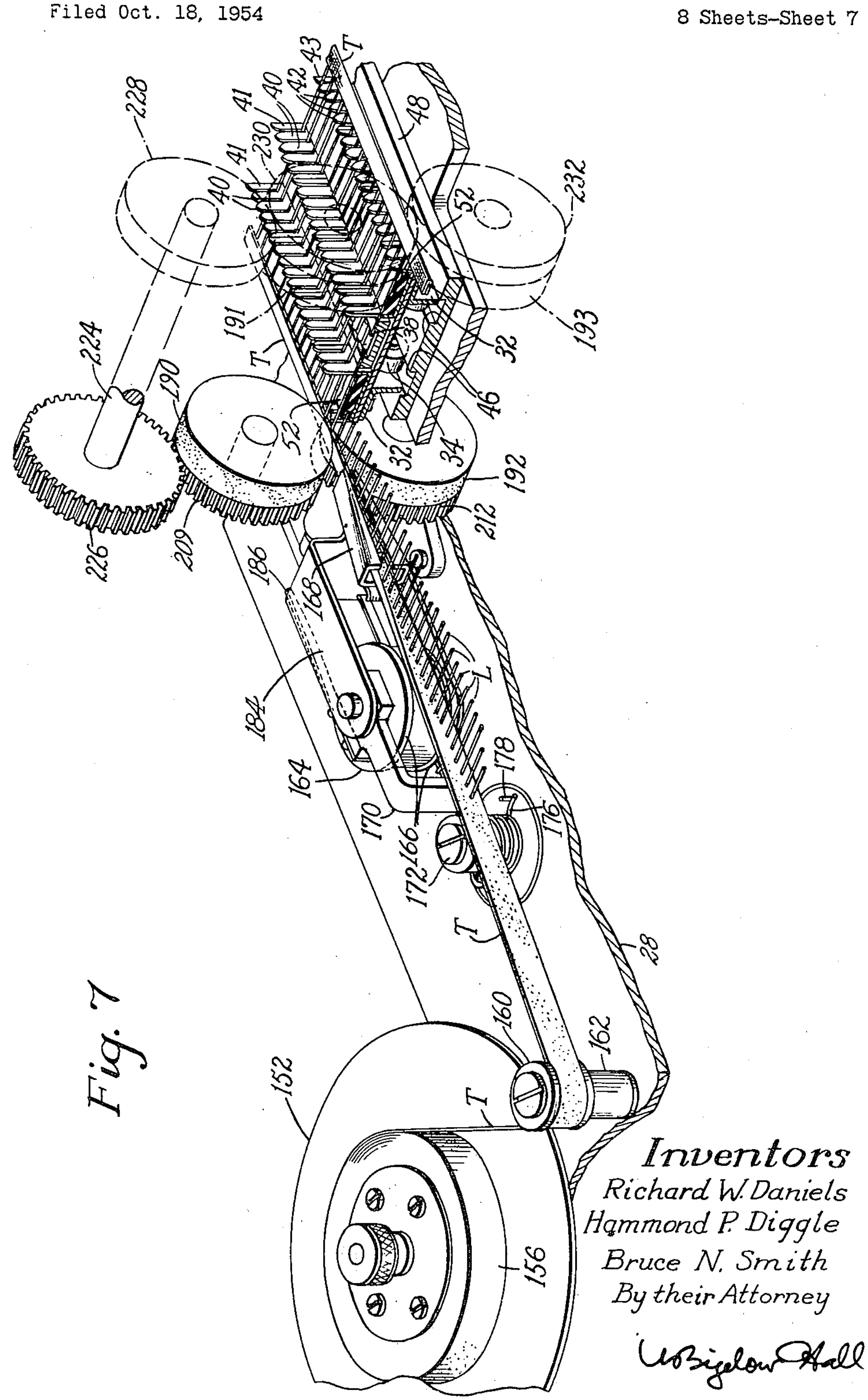
Figure 8:
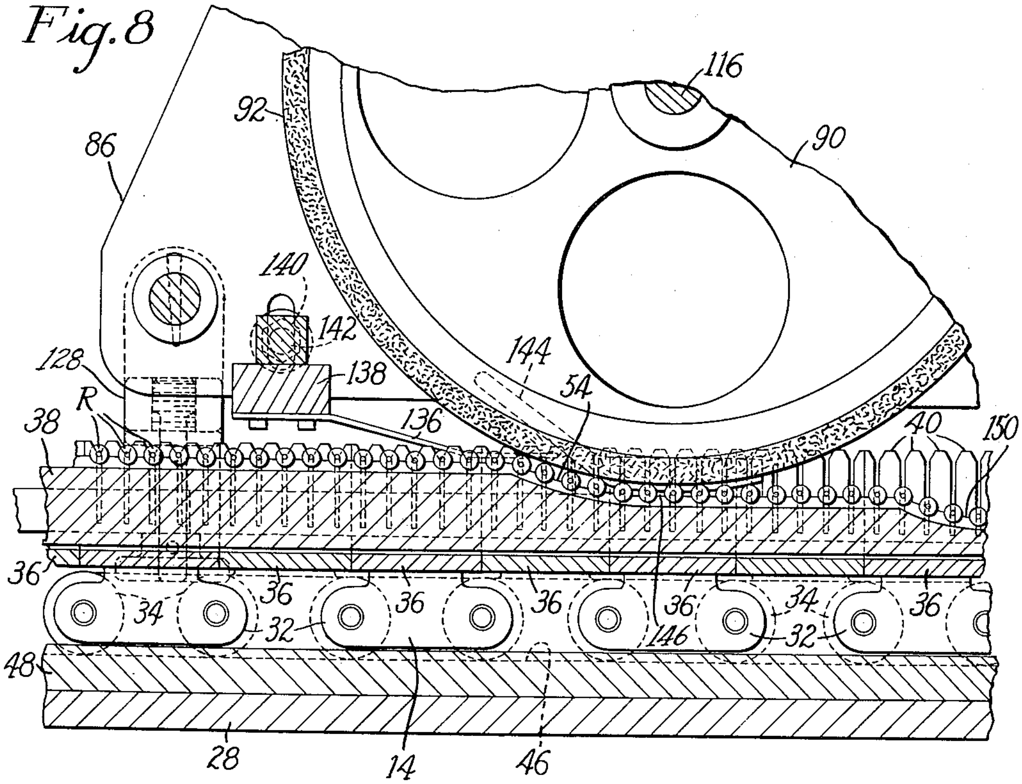

Fig. 4*a* is a plan view of a right-hand portion of the machine;

Fig. 5 is a plan view on a larger scale of taping mechanism at a midportion of the machine seen in Fig. 4, an upper frame portion being swung out of view;

Fig. 6 is a view in elevation and largely in section of the driving mechanism;

Fig. 6a is a detail view, largely in section, of parts shown in Fig. 6;

Fig. 7 is a perspective view, partly in section, of tape applying means as mounted on one side of the machine; and Fig. 8 is an elevation, partly in section and enlarged, of lead straightening mechanism shown in Fig. 1a.

The illustrative machine includes a power-operated endless conveyor generally designated 10 for moving a plurality of spaced electronic components, such as resistors R or the like, in side-by-side relation over a predetermined and generally horizontal path, a raceway 12 (Figs. 1, 2 and 3) arranged and adapted to conduct the resistors to be bundled into successive positions on the conveyor 10, and means subsequently to be described for applying tape to the coaxial leads L of the resistors R to bind them in flexible belt formation as they are being conveyed. It will be understood that for bundling other sizes and forms of components, and components having other than coaxially extending leads, the organization of the illustrative machine is susceptible of various modifications appropriate to adapt it for the particular work without departing from the spirit of this invention.

The conveyor 10 (Fig. 1) comprises an endless chain 14 mounted on a pair of double sprocket wheels 16, 18 driven by power means subsequently to be explained. These wheels are mounted on shafts 20, 22, respectively, rotatably carried by pillow blocks 24, 26 bolted to the under side of the top 28 of an elongated box-like frame 30 which may be mounted on any suitable workbench. The chain 14 includes a plurality of inverted L-shaped links 32 (Figs. 1a, 7 and 8) spaced in two parallel rows respectively meshing with the sprocket wheels, each link rotatably carrying a pair of rolls 34 and each roll 34 coupling adjacent links 32. The pairs of laterally spaced links are respectively bridged by a thin plate 36 extending transversely of the frame 30. Secured longitudinally to the central portion of the latter is a long cam guide block 38 (Figs. 1a, 4 and 5) having a recess or channel in its upper surface for accommodating the moving bodies of a plurality of resistors R in side-by-side relation, portions of their leads L adjacent to the bodies extending coaxially and resting on the block. Proceeding outwardly from both sides of the guide block 38, the leads respectively extend initially between adjacent inner alined vertical teeth 40, and subsequently between these long inner teeth and outer, and shorter, alined vertical teeth 42, respectively, formed in U-shaped members 44, 44, mounted on the plates 36. The arrangement is such that each member 44 includes four pairs of evenly spaced, full-sized and somewhat pointed teeth 40, 42 and at each end a pair of half-sized teeth 41, 43 arranged to match with the adjacent pair of similar half-sized teeth 41, 43 formed on the adjacent member 44. In traversing the upper reach of the conveyor 10 the rolls 34 are arranged to run in parallel slots 46, 46 (Figs. 1a and 7) formed in a flat guide bar 48 secured by cap screws 50 to the frame top 28.

During an intermediate portion of their travel in the upper conveyor reach, the leads L spaced parallel by the teeth 40, 42 and 41, 43 are supported between their end portions and at substantially the same horizontal level by the bottoms of these teeth and flat rubber pads 52 (Figs. 1a and 7) disposed in the respective members 44; in the course of their travel over initial portions of the upper reach, for purposes later to be explained, a series of the leads are supported by means of arcuate portions 54, 54 (only one shown in Figs. 6 and 8) of the cam guide block 38 having diminishing concavity in the direction of travel and formed to position the leads at different heights above that determined by the pads 52; and toward the end of the upper each inclined portions 56, 56 of the cam guide block 38 act progressively to raise and free the components from the teeth 40, 42 and 41, 43.

Figure 3:
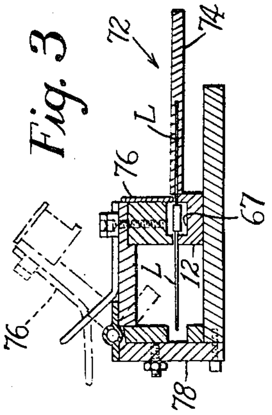
Fig. 3 is a section taken on the line III—III of Fig. 2, showing raceway structure.
Figure 2:
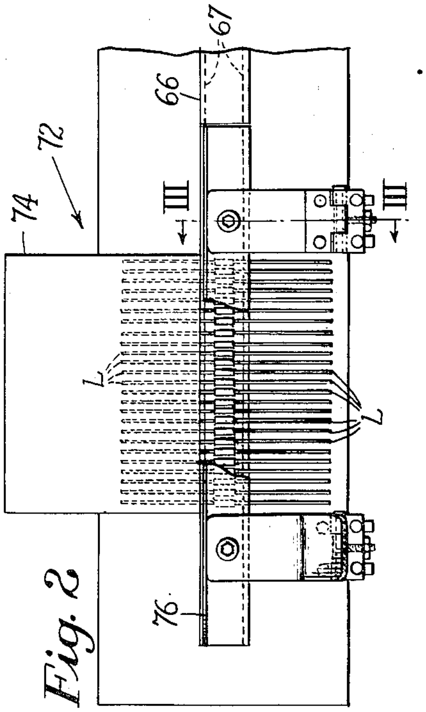
Fig. 2 is a plan view of parts shown in Fig. 1 and indicating a loading raceway receiving components to be bundled by the machine.

Any suitable hopper means may be employed for loading the conveyor 10 with the resistors R or the like. For purposes of illustration the machine herein shown is provided with the inclined raceway 12 mounted on upright brackets 60, 62 (Fig. 1) secured on a flat guard plate 64 (Figs. 1 and 4) that is adapted to protect an operator from the conveyor mechanism as he supplies the raceway with components. The plate 64 is supported on brackets affixed to the top 28. Mounted on the raceway is a longitudinally slotted cover 66 for retaining a row of resistor bodies in a longitudinally extending slot 67 formed in the raceway as they slide downwardly side by side under the influence of gravity toward a blade 68 mounted for heightwise adjustment on the delivery end of the raceway cover, this blade serving to guide the successive lowermost resistor bodies into the channel of the cam guide block 38. The arrangement is such that only a lowermost resistor may fall beneath the blade 68 and between adjacent teeth 40, the succeeding resistor having its leads spaced sufficiently heightwise by the resistor body to require them to await deposit in the next slot between successive adjacent teeth 40. As successive pairs of teeth 40, 42 and 41, 43 on opposite sides of the block 38 engage the leads of successive resistors, the bodies are thereby fed toward the right as viewed in Fig. 1 and through a tapered portion 70 (Fig. 4) in the channel accurately to center them in their path. The raceway may be filled with resistors to be bundled in any suitable way, for instance either one by one, or as indicated here, by using a commercially available packet 72 (Figs. 2 and 3) comprising a corrugated cardboard backing 74 having a definite number of spaced resistors each arranged with one lead thrust endwise therein. It is only necessary to hold each packet so that the resistor bodies are accommodated in the raceway slot 67 as shown in Figs. 2 and 3, and then a hinged retainer 76 mounted on a bracket 78 affixed to the raceway being lowered to the position shown in full lines in Fig. 3 to hold the resistor bodies in the raceway, the backing 74 is laterally withdrawn to free the resistors for downward sliding movement. A vibrator 80 (Fig. 1) of any suitable type may be attached to the raceway to insure that all resistors will slide downward without danger of jamming and that the lower portion of the raceway will be kept supplied thus avoiding gaps in the resistors being fed by the conveyor in evenly spaced alinement.

Pivotally mounted on pivot pins 82, 82 having bearings formed in brackets 84 respectively bolted to the top 28 is an open bottomed housing or frame 86 which, when the machine is in normal operating condition, extends in generally parallel relation to the frame 30. One reason for mounting the frame 86 to be swung upwardly on its pins 82 is to afford convenient access to various operating parts. The frame 86 partially houses wire straightening means now to be explained and portions of the tape applying means later to be described in addition to supporting drive mechanism for operating the machine. Thus, in order to straighten leads prior to their being bound, a motor 88 (Fig. 1) on the frame 86 is arranged to rotate on its axis a wheel 90 having a rubber tread 92 engageable with the bodies of resistors R traversing the concave portions 54, 54 (Fig. 8). For this purpose the motor drives an endless belt 94 on a pulley 96 fast on a stub shaft 98 (Figs. 1a and 4). This shaft is mounted for rotation in a sleeve bearing 100 in a bushing 102 secured by cap screws 104 to one side of the frame 86. A pinion gear 106 affixed on the stub shaft 98 is in mesh with a gear 108 fast on a stub shaft 110 journaled in the same side of the frame 86. A gear 112 also on the stub shaft 110 is in mesh with a relatively large gear 114 mounted on a shaft 116 carrying the wheel 90. In order that this wheel may be adjusted heightwise to accommodate different sizes of component bodies, the shaft 116 is supported at its opposite ends in parallel levers 118, 113, respectively, one of which is pivotally mounted on the stub shaft 110 and the other of which is pivotally supported by a fulcrum pin 120 coaxial with the shaft 110. Accordingly, for adjusting the height of the wheel 90 relatively to the frame 86 arcuate slots 122, 122 (Figs. 1, 6) in the respective sides of the frame 86 receive clamping screws 124, 124, respectively threaded into corresponding movable ends of the levers 118, 118.

The frame 86 is provided at one end with means for adjustably determining its angular relation, if any, with respect to the frame 30, and more especially with respect to the predetermined path of the resistors being bundled. For this purpose knurled screws 126, 126 (Figs. 4, 6) are threaded upwardly through the guard plate 64 and received in bores in pieces 128, 128, respectively, pivotally suspended at the ends of a cross rod 130 (Fig. 4) extending through the sides of the frame 86. Accordingly, operating pressure of the wheel 90 on the component bodies may be modified by adjusting the screws 126, or they may be unscrewed to permit the frame 86 to be swung upwardly to an out-of-the-way position.

As the resistors to be bundled are fed toward the wheel 90 they are free to be turned axially on their leads L. In order to assure that the leads L will lie on the block 38 and not work upwardly between adjacent teeth before they are fed over the portions 54, 54, a pair of spaced leaf springs 136 (Figs. 1*a*, 6 and 8) is mounted on a block 138 affixed to a cross rod 140 that extends through slots extending heightwise in the sides of the frame 86, the rod 140 being adjustably secured to the sides by clamping screws 142, 142 (Fig. 1*a*), respectively. The springs 136 are accordingly arranged yieldingly to engage the leads and urge them downwardly. Secured to the guard plate 64 on opposite sides thereof are wire straightening formers 144, 144 (Figs. 1*a*, 5, 6 and 8) respectively having under surfaces of diminishing convexity and arranged to engage the outer portions of the successive leads as they are spun axially by the action of the thread 92 on the resistor bodies traversing the concave portions 54, 54. The diminishing concavity of the latter, though acting only on narrow lead portions adjacent to the bodies, merges with the diminishing convexity of the forms 144, 144 acting on the outward lead portions to define a narrowing, horizontal and straight passageway 146 (Fig. 8) between them for the leads. In other words, a resistor having a bent lead would, when spun by the wheel 90, initially have its lead generate a cone but the upper surfaces of the block 38 in the portion 54 increasingly coact with the under surface of the former 144 progressively to reduce the conicity and confine the lead to the plane determined by the confronting flat surfaces of the block 38 and the formers 144.

Upon emerging from the straightening passageway 146, and in preparation for the application of tapes T, T, the leads are allowed by arcuate portions 150, 150 (Figs. 6 and 8) of the block 38 to be further lowered between the conveyor teeth 40 and now also between the teeth 42 until they are supported on the pads 52. Rotatable holders 152, 152 (Figs. 5 and 7) mounted on brackets 154, 154 (Fig. 5) respectively secured to the frame top 28 each support a roll 156 of tape T, having a tacky or pressure-sensitive face to be used in binding the adjacent end portions of the successive leads being conveyed. A retainer disc 158 forms part of conventional means for restraining the holder and tape against overtravel when the tape is drawn from its roll by means to be explained. Application of the tape T is effected by like means on opposite sides of the machine. In passing from the roll 156 each tape length progressively passes around a take-up roll 160 rotatably supported on a capstan 162, is next engaged by the periphery of a rotary guide roll 164 having flanges 166, 166 (Fig. 7) for fixing the path of the tape heightwise, and then passes through a U-type folder 168 (Fig. 7) arranged also to receive the end portions of successive leads to be bound. The arrangement preferably is such that the plane defined by the straightened leads contains the longitudinal center lines of the tapes being applied and passes substantially through the longitudinal axes of the folders 168, 168. The roll 164 is rotatably mounted in a bifurcated end of a bracket 170 pivotally mounted at its other end on a shoulder stud 172. This stud and the capstan 162 are threaded into a plate 174 (Fig. 5) screwed to the under side of the top 28. A helical spring 176 on the stud 172 has one end abutting a pin 178 integral with an arcuately slotted disc 180 on the stud. A clamping screw 182 extends through the slot of the disc 180 and into the plate 174. The other end of the spring 176 bears on the bracket 170 more remotely from the stud 172 and with tension adjustably determined by the setting of the screw 182 thereby yieldably maintaining the folder and guide roll in appropriate operative engagement with the tape T as the latter is engaged at its fold by successive ends of the adjacent leads. As herein shown, in order yieldably to maintain the folder 168 substantially parallel to the row of lead ends, it is integral with a bracket 184 that is supported on the bracket 170 for pivotal movement about the axis of the guide roll, a leaf spring 186 screwed to the bracket 170 urging the folder toward the leads.

Almost immediately after the tapes have been doubled lengthwise on themselves to envelope the lead ends, two pairs of cooperative presser rolls 190, 192 and 191, 193 (Figs. 1, 6 and 7) respectively act on the tapes to insure that the leads are embedded in transversely extending pockets that are thus formed in the tape. Power means for operating these rolls and for driving the conveyor while assuring that the leads of each resistor will be held in coaxial relation during the belting procedure will now be described. The motor 88 is operatively connected by an endless belt 194 with a pulley 196 mounted on a reduction gear housing 198 and an endless drive chain 200 (Fig. 6) is accordingly rotated at appropriate reduced speed over a drive sprocket 202 on a shaft journaled in the housing 198, over a sprocket 204 on an end of a shaft 206 carrying a double-sprocket wheel 208, and over a sprocket wheel 210 on a shaft 211 journaled in the frame 86 and carrying the presser roll 190. A gear 209 on the shaft 211 meshes with a gear 212 integral with the presser roll 192. Axles for the lower rolls 192, 193 have their bearings, respectively, in pillow blocks 214, 214 (Fig. 5) secured on the top 28 of the frame 30, the axle for the roll 192 extending to support a sprocket 216 (Fig. 4*a*) for driving the conveyor sprocket 16 by means of a chain 218 and a sprocket 220 fast on the shaft 20. The roll 191 is mounted in a bearing formed in the side of the frame 86.

In order to drive the presser rolls 191, 193, a cross shaft 224 (Figs. 6, 7) journaled in the frame 86 carries at its ends respectively a gear 226 in mesh with the gear 209 and a gear 228 in mesh with a gear 230 integral with the roll 191. The gear 230 is arranged to mesh with a gear 232 integral with the presser roll 193. Thus it will be seen that a pair of parallel, endless link-type feed chains 234, 234 (Fig. 6*a*), operated over a double-sprocket wheel 235 and driven by the double-sprocket wheel 208, and having lead engaging rubber pads 236 (Figs. 6, 6*a*) secured on their chain links are arranged to cooperate with, and travel at the same speed as, the conveyor pads 52 of the conveyor 10. The wheel 235 is mounted on a shaft 238 journaled in the sides of the frame 86.

For the purpose of insuring that the pads 236 of the chains 234, 234 bear with sufficient pressure on the conveyor pads 52 to restrain the leads L against bending while imparting traction that is adequate to feed the components at suitable speed and also unreel the tapes T which are being applied, a flat presser bar 240 (Fig. 6) is provided having spaced long grooves 242 (Fig. 6*a*). These grooves constitute guideways for rollers 244 coupling the links of the feed chains 234, 234. The bar 240 (Fig. 6*a*) is supported at opposite ends by a pair of annular projections 246, 246 bored to receive a cross rod 248 which extends through vertical slots 250 formed in the sides of the frame 86, these slots serving to hold the bar 240 against longitudinal movement, but permitting it to be moved heightwise with respect to the conveyor 10 to the extent adjustably permitted by adjusting screws 252 threaded through lugs formed on the sides of the frame 86 and respectively abutting endwise flattened extremities of the rod 248. Collars 254, 254 (Fig. 6*a*) adjustably fixed on the rods 248 prevent lateral shifting of the bar 240 thereon, and collars 256, 256 similarly affixed on the rod 248 and abutting inside portions of the frame 86 prevent lateral movement of the rod.

In order that the bundled components may be accumulated in orderly arrangement without rendered them liable to being bent or maltreated prior to their application in circuitry, the machine is provided at one end with a spindle 260 for rotatably and detachably mounting a winding reel 262 (Fig. 4*a*). The spindle 260 is supported in a bracket 264 fast on the frame 30 and carries a pulley 266 operatively connected by a belt 268, the latter being driven by a pulley 270 secured on the shaft 20. A simple slip type clutch in the form of a spring pressed disc 272 bearing on the pulley 266 is effective to assure that reel winding occurs at a rate corresponding with the output of the conveyor 10, the disc 272 being permitted to slide on the side of the pulley 266 after effecting suitable tension in the tapes T, T being wound.

Briefly to review operation of the illustrative machine, the raceway 12 is kept supplied with resistors R or other coaxial lead type components, which by gravity and vibration are induced downwardly and allowed to fall one at a time transversely onto the long cam guide block 38, the leads L being received in the alined spaces between adjacent teeth 40 and 41, 43. The spacing of these teeth is so related to the diameter of the component bodies that the conveyor 10 is automatically loaded with components evenly spaced apart in side-by-side relation. The teeth act on the leads to traverse them over the guide block 38 and the latter controls movement of the leads heightwise relatively to the teeth. The leads are accordingly lowered over arcuate guide block portions 54, 54 when the perimeter of the wheel 90 is effective to spin them axially. When the spinning leads proceed through the passageway 146 defined by flattened parts of the block 38, into which the portions 54, 54 respectively merge, and the flat portions of the convex lead forming members 144, 144, any bent leads have been increasingly deflected by the latter toward a proper coaxial position.

By reason of the cooperative relation of the rubber pads 236 with the rubber pads 52 supporting the straightened leads, traction is imparted to the conveyor 10 to feed successive components through the wire straightening means, including the spinning wheel 90, through the folders 168, 168, and between the cooperative presser rolls 190, 192, and 191, 193. It has been found that the illustrative machine is capable of binding components and accumulating them on the reel 262 at a rate in excess of 40,000 per hour.

Having thus described our invention, what we claim as new and desire to secure by Letters Patent of the United States is:

1. A machine for bundling components having coaxial leads comprising means engageable with the leads for conveying a succession of said components in spaced side by side relation along a path, a guide block extending in said path and adapted to maintain the bodies of said components in a straight row as they are fed by said means, and taping means arranged adjacent to the ends of the leads progressively to bind them, said taping means respectively including a folder for successively receiving the end portions of the leads to envelope them in a longitudinal fold of the tape being applied.

2. A machine for bundling components having coaxial leads comprising means for feeding a series of said components side by side in a row, power driven mechanism for operating said feeding means, tape applying means arranged adjacent to the ends of the leads being fed, said tape applying means including, respectively, a folder adapted to envelop adjacent lead ends in a length of tape, and a pair of cooperative presser rolls for embedding said lead ends in the folded tape, and a pair of reels rotatably mounted to supply continuous lengths of tape to the respective tape applying means.

3. A machine as set forth in claim 2, and further characterized in that said pairs of presser rolls and said reels have an operative connection with said power driven mechanism.

4. In a machine for linking components which have leads that extend only generally coaxially, means for feeding a succession of said components along a path, an arcuate portion of which becomes increasingly flat in the direction of feed, said means being adapted to restrain the bodies of said components in side-by-side formation while permitting their axial rotation, a wheel mounted frictionally to engage the bodies of said components traversing the arcuate portion to spin them axially, and lead straightening members on opposite sides of said wheel, said members having convex lead engaging surfaces merging with the flat portion of said path to deflect and straighten the lead portions remote from the component bodies.

5. A machine for straightening generally coaxial leads of components comprising a guide member having surfaces engageable with lead portions adjacent to the opposite ends of the respective component bodies to support them in a row for axial rotation, means for feeding the components along a path as they are thus supported, means operable on successive component bodies being fed to spin their leads, and lead forming members arranged to be engaged by the spun leads in their portions more remote from the bodies, said supporting and forming members progressively defining a planar passageway as they extend in the direction of feed to straighten the leads by increasingly restricting them to planar travel therethrough.

6. In a machine for linking components having leads generally extending coaxially, means for feeding a plurality of feed components along a path with their bodies arranged in a row and side by side, means engaging a series of said components adjacent to their bodies to support them during feeding for axial rotation, the last mentioned means extending with a curvature decreasing to zero in the direction of feed, power operated mechanism for driving said feeding means, a wheel operable by said power mechanism on the component bodies traversing said curvature to spin them axially, lead straightening members on opposite sides of said wheel having lead deflecting surfaces of decreasing curvature in the direction of feed, and means for binding the end portions of the successive leads after they have progressed beyond said members.

7. A machine for bundling components having coaxial leads comprising, in combination, means for conveying a plurality of said components in a row and side by side, means for straightening the leads as they are conveyed, and tape applying means for binding the end portions of successive leads after they have been straightened.

8. A machine for bundling components having coaxial leads comprising means for conveying a plurality of said components in a row and side by side, mechanism for driving said conveyor means, means for spinning the leads axially as they are conveyed to straighten them, and means for successively embedding the end portions of the straightened leads in longitudinally folded tapes, the last-mentioned means having operative connection with said conveyor driving mechanism.

9. A machine for bundling components having coaxial leads comprising means for conveying a plurality of said components in spaced side-by-side relation along a path, said means including teeth alined to provide parallel lead receiving slots, a guide block extending in said path for supporting successive components by engagement with the lead portions adjacent to their bodies, said guide block being adapted to maintain the succession of component bodies in row formation, means cooperative with the guide block for straightening the leads, and tape applying means for thereafter binding the end portions of the leads as the components are being fed.

10. In a machine for conveying coaxial lead components to be treated, an endless conveyor having transverse lead receiving slots arranged to hold the components in spaced side-by-side relation, an inclined raceway having a delivery end adjacent to the conveyor for conducting successive components thereto, said raceway having a longitudinal channel portion adapted partly to accommodate the bodies of components extending transversely therein while engaging their adjacent lead portions, and a member movably mounted with respect to the raceway, said member being adapted in one position to permit reception of a series of mounted components in the channel portion and in another position to retain said series of components in the channel portion while permitting withdrawal of their mounting.

11. A machine for bundling components having coaxial leads comprising an endless conveyor for feeding a plurality of said components along a path in side-by-side relation, said conveyor including laterally spaced lead-engaging teeth and pads, means for loading the conveyor with components, a cam guide block extending in said path and engageable with portions of the leads adjacent to the component bodies to guide and support them as they are fed, a wheel having a tread arranged axially to spin the successive bodies along said path while they traverse an arcuate portion of the cam guide block, said arcuate portion of the cam guide block becoming flat in the direction of feed, a pair of lead formers respectively adjacent to the arcuate and flat portions of the cam guide block and arranged to deflect and straighten bent portions of the leads as they are spun, means at opposite sides of the machine for folding a continuous length of tape over the end portions of the straightened leads, means on opposite sides of the machine for supplying a length of tape progressively to said tape folding means, and means for driving said conveyor including laterally spaced presser pads arranged in endless formation to bear on said conveyor pads and the straightened leads.

12. A machine for bundling components having coaxial leads comprising an endless conveyor for feeding a plurality of said components along a path in side-by-side relation, said conveyor including laterally spaced lead-engaging teeth and pads, means for loading the conveyor with components, a cam guide block extending in said path and engageable with portions of the leads adjacent to the component bodies to guide and support them as they are fed, a wheel having a tread arranged axially to spin the successive bodies along said path while they traverse an arcuate portion of the cam guide block, said arcuate portion of the cam guide block becoming flat in the direction of feed, a pair of lead formers respectively adjacent to the arcuate and flat portions of the cam guide block and arranged to deflect and straighten bent portions of the leads as they are spun, means at opposite sides of the machine for folding a continuous length of tape over the end portions of the straightened leads, means on opposite sides of the machine for supplying a length of tape progressively to said tape folding means, and means for driving said conveyor including laterally spaced presser pads arranged in endless formation to bear on said conveyor pads and the straightened leads, said conveyor driving means being effective to operate said tape supplying and folding means.

13. In a machine for belting coaxially leaded components, mechanism for applying tape transversely of the components to bind the leads, and means for conveying the components in a row and side by side to and through said taping mechanism, said means including a member having a channel to accommodate the bodies of the components in succession, alined inner teeth spaced laterally to engage the successive leads adjacent to the component bodies, and outer teeth arranged to engage the extremities of the respective leads to hold them in coaxial relation.

14. In a machine for belting coaxially leaded components, mechanism for applying a length of tape transversely of the leads, means for conveying the components in a row and side by side to and through said taping mechanism, means cooperative with said conveying means for straightening the leads prior to the application of tape by said mechanism, said conveying means including alined inner teeth spaced laterally to engage the leads adjacent to the component bodies and outer teeth arranged to engage the leads at their extremities, said outer teeth being disposed to engage the leads after they have been straightened to hold them in coaxial relation.

15. A machine for belting electronic components having coaxial leads comprising a main frame, conveyor means mounted thereon for moving said components in a row and including pairs of laterally alined inner and outer teeth for engaging their leads on opposite sides of their respective bodies, said teeth also being spaced longitudinally by substantially the diameter of the leads to maintain the components in predetermined formation during their travel, means mounted on the frame for depositing successive components between the rows of laterally alined teeth, and tape dispensing means mounted on the frame and actuable in response to operation of the conveyor means for applying tape transversely of the deposited components as they are being moved by the conveyor means to bind them in belted relation.

16. A machine for belting electronic components having coaxial leads comprising a main frame, conveyor means mounted thereon for moving said components sidewise in a row, said means including a plurality of teeth arranged laterally to engage the leads of successive components on opposite sides of their bodies and longitudinally to hold the components evenly spaced apart as they are being moved, means including a vibrator for loading components successively on said conveyor means, means mounted on the frame for applying tape transversely of the row of components as they are being moved to belt them in row formation, and a plurality of pads movably mounted for yielding engagement with the leads to restrain them against bending during application of the tape.

References Cited in the file of this patent

UNITED STATES PATENTS

| | | |
|---|---|---|
| 447,295 | Brenner | Mar. 3, 1891 |
| 1,071,945 | Moon | Sept. 2, 1913 |
| 1,109,662 | Cavanagh | Sept. 8, 1914 |
| 1,667,656 | Roberts et al. | July 17, 1928 |
| 1,776,255 | Frontz | Sept. 23, 1930 |
| 1,946,056 | Budsey | Feb. 6, 1934 |
| 2,113,549 | Neher | Apr. 5, 1938 |
| 2,639,830 | Wermont | May 26, 1953 |